United States Patent [19]

Wilhelm et al.

[11] Patent Number: 5,576,414
[45] Date of Patent: Nov. 19, 1996

[54] PROCESS FOR GENERATING A VACUUM IN PRODUCTION OF POLYCARBONATE

[75] Inventors: Fritz Wilhelm, Karben; Rudolf Kaempf, Gruendau; Walter Wenzel, Rossdorf; Klaus Mackensen, Frankfurt am Main, all of Germany

[73] Assignee: Zimmer Aktiengesellschaft, Germany

[21] Appl. No.: 539,733

[22] Filed: Oct. 5, 1995

[30] Foreign Application Priority Data

Nov. 15, 1994 [DE] Germany ............... 44 40 741.6

[51] Int. Cl.⁶ .................................. C08G 64/00
[52] U.S. Cl. .............. 528/199; 55/468; 159/3; 159/4.01; 417/118; 417/151; 422/138
[58] Field of Search ............ 417/118, 151; 422/138; 55/468; 159/3, 4.01; 528/196, 199

[56] References Cited

U.S. PATENT DOCUMENTS

| | | | |
|---|---|---|---|
| 3,468,849 | 9/1969 | Rothert et al. | 528/176 |
| 3,535,280 | 10/1970 | Schnell et al. | 528/196 |
| 3,888,826 | 6/1975 | Yamana et al. | 528/196 |

*Primary Examiner*—James J. Seidleck
*Assistant Examiner*—Terressa Mosley
*Attorney, Agent, or Firm*—Banner & Allegretti, Ltd.

[57] ABSTRACT

Process for generating a vacuum and separating the condensable components of the vapors of melt-phase polycondensation in the production of polycarbonate, where at least one or two vapor jets with a downstream spray condenser are connected to the intake side of the polycondensation reactor to be evacuated, and the motive vapor is diphenyl carbonate vapor, and the spray liquid is liquid diphenyl carbonate.

8 Claims, No Drawings

PROCESS FOR GENERATING A VACUUM IN PRODUCTION OF POLYCARBONATE

BACKGROUND OF INVENTION

The present invention concerns a process for generating a vacuum and separating condensable components of the vapors of melt-phase polycondensation in production of polycarbonate.

PRIOR ART

Polycarbonates are industrial plastics with excellent properties. They are produced either by an interfacial condensation process or by melt polycondensation in an ester exchange process. In the melt process, aromatic dihydroxy compounds such as bis(4-hydroxyphenyl)alkanes, especially bis-phenol A, are transesterified with diphenyl carbonate in the presence of catalysts, while oligomerizing and splitting off phenol, and finally are subjected to polycondensation in several stages with a progressive vacuum (German patent Auslegeschrift 1,495,730, German patent 2,334,852 (correspond to U.S. Pat. Nos. 3,535,280 and 3,888,826, respectively)). The stages of polycondensation take place at a high vacuum at a pressure of less than 3 mbar, and even less than 1 mbar in the final stage, and at temperatures up to 310° C.

The vacuum is generated in the usual way by means of mechanical pumps that are upstream or downstream from surface condensers for separating the condensable components present in the polycondensation vapors, mainly phenol, small amounts of monomers and some polycarbonate oligomer. A disadvantage of this is that the vapor volume is very large in accordance with the high vacuum, and the equipment, especially the vacuum pumps, must be designed for very large volumes. The condensable components also imply frequent interruptions in operation at necessarily low condensation temperatures, because of deposits on the surface condensers, in the pump and in the pipeline system. Therefore, there have already been proposals for generating the vacuum for the final stage(s) of polycondensation with two successive water vapor jets that are less susceptible to problems while retaining the surface condenser (Stanford Research Institute, Menlo Park, Calif. (SRI Report No. 50B (1982) Polycarbonates, FIG. 5.1)). However, this leads to a very significant environmental problem, namely large quantities of waste water polluted with phenol and oligomers. Oligomer deposits inside the water vapor jets also lead to problems.

It is further known that the vacuum in the final polycondensation stage in the production of polyethylene terephthalate from ethylene glycol and terephthalic acid or its ester can be generated by means of vapor jets with a downstream spray condenser, where liquid ethylene glycol is used as the spray liquid and ethylene glycol vapor is used as the motive medium with an absolute pressure of about 2 bar (U.S. Pat. No. 3,468,849 and German patent Offenlegungschrift 2,227,261, corresponds to U.K. patent 1,382,095). The apparatus and equipment are well known. Ethylene glycol is liquid at room temperature and boils at 222° C. at 2 bar, while the starting monomers in the production of polycarbonate are solid at room temperature and have a high boiling point of more than 300° C. at atmospheric pressure, under which conditions undesired decomposition reactions and side reactions occur. While ethylene glycol, which is identical to the motive vapor, is the monomer and the split product of the polycondensation in the polyethylene terephthalate process, phenol is split off in polycondensation of polycarbonate. Phenol is different from the monomers and has especially detrimental properties with regard to operating reliability, corrosion and toxicity. Thus, it is not possible to transfer this procedure directly to the production of polycarbonate.

SUMMARY OF THE INVENTION

The object of the present invention is to provide a process for generating a vacuum in the production of polycarbonate and for separating the condensable components of the vapors of multi-stage melt-phase polycondensation, especially the last stage of polycondensation, that will lead to a reduction in the volume of vapors in comparison with the processes according to the state of the art described above. Another object is to avoid production problems due to monomer and oligomer deposits while also avoiding any waste water polluted with phenol and oligomers.

These objects are achieved according to this invention by a process described in the specifications and in the patent claims. This process is characterized in that a vacuum is generated by at least one or two vapor jets connected to the suction side of the polycondensation reactor to be evacuated, and the condensable components are separated in a downstream spray condenser, where the motive vapor of the jet(s) is diphenyl carbonate vapor with an absolute pressure in the range of 0.3 to 1.5 bar and the spray liquid of the condenser is liquid diphenyl carbonate.

DESCRIPTION OF THE PREFERRED EMBODIMENTS

It has surprisingly been found that diphenyl carbonate is excellent for use as motive vapor in the operation of a vacuum generating vapor jet and as spray liquid for spray condensation of the high-boiling components in the polycondensation vapors despite its melting point of about 79° C. and its boiling point of about 310° C. at 1 bar. The motive vapor has a pressure in the range of 0.3 to about 1.5 bar. Within this range the higher pressures are preferable from the standpoint of the energy efficiency, but a thermal more gentle process may be necessary in accordance with a motive vapor pressure in the range of 0.5 to 1.0 bar (absolute), depending on the design conditions. At higher motive vapor pressures, one steam jet is usually sufficient per compression stage, whereas at low motive vapor pressures, two vapor jets are preferably connected upstream from the spray condenser. The jet(s) and the condenser are of a design similar to those used in polyethylene terephthalate processes. The temperature of the motive vapor corresponds to the boiling point of the diphenyl carbonate at the given pressure. In order to safely prevent any condensation in the area of the vapor jet, especially at low motive vapor pressures, the diphenyl carbonate vapor can also be superheated by 1° to 20° C., preferably by 3° to 7° C. above its boiling temperature at the given pressure, between the vapor generator and the vapor jet.

The vapor mixture leaving the vapor jet(s) consists of diphenyl carbonate motive vapor and of the polycondensation vapors containing phenol, polycarbonate oligomer and monomer and is sent to a directly connected spray condenser, where the condensable components are condensed and separated by spraying the vapor mixture with liquid diphenyl carbonate. In order to achieve the maximum separation efficiency, the temperature of the spray liquid must be as low as possible. A temperature in the range of 80° to 120°

C., preferably 85° to 110° C., is recommended, depending on the purity of the diphenyl carbonate spray liquid.

A part of the condensate leaving of the spray condenser is preferably recirculated as the spray liquid with appropriate temperature regulation and another part of the condensate is sent to an evaporator for regeneration of motive vapor. The excess condensate is discharged from the vapor jet/spray condenser system and recycled within the process or sent to a recovery plant. This also prevents the oligomers, monomers and phenol from accumulating in the condensate. The condensate from several spray condensers can be combined in a collecting tank before dividing it into substreams.

On leaving the first spray condenser, the uncondensed vapor phase has a higher pressure than the polycondensation reactor in accordance with the compression ratio of the upstream vapor jet(s). Further compression can be accomplished exclusively in other similar diphenyl carbonate vapor jet/diphenyl carbonate spray condenser stages, or exclusively with mechanical vacuum pumps, or in one to three or more vapor/jet spray condenser stages followed by at least one mechanical vacuum pump. The term mechanical vacuum pump as used here refers to a vacuum compressor and/or a liquid ring pump. The operating fluid for the liquid ring pump may be condensate from the condensers and/or liquid diphenyl carbonate. Heat exchangers and/or additional condensers may also be connected in between as needed. At the same time, the vacuum for the preceding polycondensation stages can be generated with these additional compression stages. If mechanical vacuum pumps are used, they may also be used for generating the vacuum of the ester exchange stage as well.

A substream of condensate from the spray condensers is sent to an evaporator for generating the motive vapor for the vapor jets. The evaporator can also be operated exclusively with pure diphenyl carbonate without recycling the condensate. The operating pressure of the evaporator is slightly higher—in accordance with the pressure drop in the pipelines and fittings—than the desired pressure of the motive vapor. Otherwise, the evaporator including the accessory equipment is operated in the conventional way. The vapor leaving the evaporator can be superheated by 1° to 20° C. in a conventional superheater before being injected into the vapor jet(s). When there are several vapor jet stages, the diphenyl carbonate vapor leaving the evaporator or the superheater is divided into several substreams accordingly. The bottom phase of the evaporator is continuously partially discharged and reused with or without purification.

The process according to this invention permits a trouble-free and economically effective method of generating a vacuum for one or more polycondensation reactors in the production of polycarbonate by the melt process. The possibility of interruptions in operation due to oligomer deposits or due to saturation of surface condensers is practically excluded. All materials are recycled within the process. Pollutant emissions are minimized, and specifically there is no waste water polluted with phenol, oligomers and monomers.

We claim:

1. In a process for generating a vacuum and separating the condensable components in the vapors of melt-phase condensation in the production of polycarbonate, the improvement which comprises generating said vacuum by at least one vapor jet connected to the suction side of the polycondensation reactor to be evacuated, and separating said condensable components in a downstream spray condenser, and injecting diphenyl carbonate vapor as the motive vapor into said vapor jet at an absolute pressure in the range of about 0.3 to about 1.5 bar and spraying liquid diphenyl carbonate into said spray condenser.

2. Process of claim 1 in which said melt-phase polycondensation is carried out in several stages and said polycondensation reactor to be evacuated is the last stage polycondensation reactor.

3. Process of claim 1 in which said melt-phase polycondensation is carried out in a series of multiple polycondensation reactors, and the reactors to be evacuated are the last one and at least one preceding reactor.

4. Process of claim 1 which includes at least one downstream mechanical vacuum pump on the delivery side of said spray condenser.

5. Process of claim 1 in which said separated condensable components discharged from said spray condenser are divided in three streams, one stream being recirculated to said condenser as spray liquid, the second stream being converted to said motive vapor, and the last stream being recycled within the polycondensation process or sent to a recovery plant.

6. Process of claim 1 in which said diphenyl carbonate motive vapor has an absolute pressure of 0.5 to 1.0 bar.

7. Process of claim 1 in which said diphenyl carbonate motive vapor is superheated by 1° to 20° C. above its boiling temperature at said pressure before entering said vapor jet.

8. Process of claim 1 in which said diphenyl carbonate spray liquid has a temperature in the range of 80° to 120° C.

\* \* \* \* \*